United States Patent
Yuan et al.

(10) Patent No.: US 11,936,920 B2
(45) Date of Patent: Mar. 19, 2024

(54) METHOD AND SYSTEM FOR TRANSMITTING A VIDEO STREAM

(71) Applicant: Axis AB, Lund (SE)

(72) Inventors: Song Yuan, Lund (SE); Mikael Murstam, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/944,198

(22) Filed: Sep. 14, 2022

(65) Prior Publication Data

US 2023/0129908 A1    Apr. 27, 2023

(30) Foreign Application Priority Data

Oct. 22, 2021 (EP) ..................................... 21204318

(51) Int. Cl.
*H04N 21/218* (2011.01)
*H04N 5/45* (2011.01)
*H04N 21/2662* (2011.01)

(52) U.S. Cl.
CPC ......... *H04N 21/21805* (2013.01); *H04N 5/45* (2013.01); *H04N 21/2662* (2013.01)

(58) Field of Classification Search
None
See application file for complete search history.

(56) References Cited

U.S. PATENT DOCUMENTS 10,904,446 B1 * 1/2021 Ostap ..................... H04N 23/61
2003/0086003 A1 5/2003 Koga (Continued)

FOREIGN PATENT DOCUMENTS

CN    104822070 A    8/2015

OTHER PUBLICATIONS

Extended European Search Report dated Apr. 4, 2022, in corresponding European Patent Application No. 21204318.6.

(Continued)

*Primary Examiner* — Ricky Chin
(74) *Attorney, Agent, or Firm* — XSENSUS LLP

(57) ABSTRACT

The present disclosure relates to a method of providing a video stream from a system comprising a main unit and a plurality of sensors, wherein the main unit is configured to receive data from the plurality of sensors, the method comprising the steps of: transmitting a multi-view video stream from the main unit to a client, wherein the multi-view video stream represents a multi-view composed of sensor data views from the plurality of sensors in the system; receiving, in the main unit, a command from the client representing a zoom-in operation; computing an updated multi-view according to the received command; evaluating if the updated multi-view includes an area outside a dominating sensor data view in the updated multi-view that is greater than a predetermined threshold; if the area outside the dominating sensor data view is greater than the predetermined threshold, transmitting a multi-view video stream representing the updated multi-view; if the area outside the dominating sensor data view is less than, or equal to, the predetermined threshold, transmitting a single-view video stream representing the dominating sensor data view. The present disclosure further relates to a system for providing a video stream comprising sensor data views.

13 Claims, 6 Drawing Sheets

(56) References Cited

U.S. PATENT DOCUMENTS

| | | | | |
|---|---|---|---|---|
| 2005/0232167 | A1* | 10/2005 | Gilbert | H04N 7/1675 348/E7.071 |
| 2006/0056056 | A1* | 3/2006 | Ahiska | H04N 7/181 359/690 |
| 2006/0184966 | A1* | 8/2006 | Hunleth | G06F 3/0346 348/E5.103 |
| 2006/0230427 | A1* | 10/2006 | Kunkel | H04N 21/235 725/100 |
| 2006/0236342 | A1* | 10/2006 | Kunkel | H04N 21/4821 725/86 |
| 2007/0011702 | A1* | 1/2007 | Vaysman | H04N 21/4828 348/E7.071 |
| 2008/0291279 | A1* | 11/2008 | Samarasekera | G08B 13/19693 348/E7.086 |
| 2012/0038776 | A1 | 2/2012 | Ahiska et al. | |
| 2012/0327246 | A1* | 12/2012 | Senior | H04N 23/62 348/E7.085 |
| 2018/0176507 | A1* | 6/2018 | Song | H04N 7/152 |
| 2018/0262708 | A1* | 9/2018 | Lee | H04N 5/45 |
| 2019/0066335 | A1* | 2/2019 | Dahlström | H04N 23/80 |
| 2019/0130529 | A1* | 5/2019 | Son | G06T 3/4038 |
| 2021/0029343 | A1* | 1/2021 | Hamada | H04N 23/60 |
| 2021/0160549 | A1* | 5/2021 | Makinen | H04N 21/44008 |
| 2021/0217444 | A1* | 7/2021 | Lilijeroos | G11B 27/10 |
| 2021/0223922 | A1* | 7/2021 | Liu | G06F 3/04817 |
| 2021/0337158 | A1* | 10/2021 | Keskikangas | H04N 5/2628 |
| 2023/0109787 | A1* | 4/2023 | O'Leary | H04L 12/1822 348/14.09 |
| 2023/0129908 | A1* | 4/2023 | Yuan | H04N 7/18 348/159 |

OTHER PUBLICATIONS

Office Action dated Jun. 29, 2023, in corresponding European Patent Application No. 21204318.6.

Intention to Grant dated Aug. 7, 2023, in corresponding European Patent Application No. 21204318.6.

* cited by examiner

METHOD AND SYSTEM FOR TRANSMITTING A VIDEO STREAM

CROSS-REFERENCE TO RELATED APPLICATION

This application claims priority to European Patent Application No. 21204318.6 filed on Oct. 22, 2021, the entire disclosure of which is incorporated by reference herein.

The present disclosure relates to a computer-implemented method and a system for providing a video stream comprising sensor data views. More specifically, the disclosure relates to the handling of a video stream based on multi-views and single-views of the sensor data views. A computer program for the same purpose is also disclosed.

BACKGROUND

Real-time video surveillance systems have become increasingly popular in a wide range of applications. In multi-directional and multi-channel cameras the camera produces streams from each individual sensor/channel. The camera can also be set up to output a so called multi-view stream that combines all sensors/channels into one video stream. The sensors may be located in a single camera device or in several camera devices connected to each other.

A surveillance system can be said to include an edge side, which is where images, videos or other content are acquired, and a client side, which is where visual content in the form of 'views' is presented to a user. A 'view' may be seen as a configuration of visual content on an output device for presenting visual information. The term is frequently used for video content. As an example, a quad view is a view composed of four video sources.

A multi-view on a client side of a video system can be achieved in two ways. A first way of providing a multi-view on the client side is to compose the multi-view stream on the edge side and transmit one, i.e. a single, stream to the client. A second way of providing a multi-view on the client side is to transmit separate, i.e. multiple, streams from the edge side and compose the multi-view on the client side. The present disclosure relates to the first way of providing a multi-view on the client side, i.e. transmitting one stream.

Different types of multi-view layouts exist. One is to arrange views side-by-side, for example, as a quad view with four views forming a square. Another type is so called picture-in-picture where views are arranged to overlap each other. For example, an image part in one view may be replaced with video from another camera showing the same scene part. In other variants, the overlay video may show an overview of a scene, whereas a secondary view may show a zoomed in view of the scene. Yet another format of multi-view is to add a sensor data representation in or at a side of a video. The sensor data may be captured by a sensor of another type than image sensor, such as a sensor for counting people passing an entrance.

A Pan Tilt Zoom (PTZ) camera is a camera that is capable of directional and zoom control. A PTZ camera uses optical zoom and motors to physically adjust the camera's aim and zoom. In a Digital Pan Tilt Zoom (PTZ) camera, the tilt, pan and zoom operations do not involve movement of mechanical parts. Instead, the tilting, panning and zooming is done by electronically navigating and scaling within the camera's viewing area.

Existing systems with support for multi-view configuration do not offer PTZ operations in the multi-view. To the extent that it would be provided, it would be a matter of processing the multi-view composed of several views, for example, by digitally scaling up a sub-section of the multi-view image. There is thus a need for a system that can handle the views of the multi-view streams and resolutions of the same more efficiently.

SUMMARY

One objective of the present disclosure is to provide a method and a system for providing a video stream, which offers enhanced video quality and a seamless user experience in the context of multi-view video streaming and zooming of the same. A first aspect of the present disclosure relates to a method of providing a video stream from a system comprising a main unit and a plurality of sensors, wherein the main unit is configured to receive data from the plurality of sensors, the method comprising the steps of:

transmitting a multi-view video stream from the main unit to a client, wherein the multi-view video stream represents a multi-view composed of sensor data views from the plurality of sensors in the system;

receiving, in the main unit, a command from the client representing a zoom-in operation;

computing an updated multi-view according to the received command;

evaluating if the updated multi-view includes an area outside a dominating sensor data view in the updated multi-view that is greater than a predetermined threshold;

if the area outside the dominating sensor data view is greater than the predetermined threshold, transmitting a multi-view video stream representing the updated multi-view; and if the area outside the dominating sensor data view is less than, or equal to, the predetermined threshold, transmitting a single-view video stream representing the dominating sensor data view.

The client thus always receives one stream that is either a single-view video stream or a multi-view video stream. The client, which may be, for example, a web browser, a video management system (VMS), an application on a mobile phone, or any other suitable user interface, receives the video stream. The client can send commands to the main unit through, for example, an application programming interface (API), such as an http-based API, such as VAPIX, to control, for example, pan, tilt, and zoom functionality of the main unit. The main unit may consequently be configured to receive application programming interface (API) commands from the client to control operations related to zoom-in operations. The main unit may comprise a camera having a number of sensors, for example, in the form of image sensors. An example of an embodiment of such as system is shown in FIG. 1. From a client perspective there is a continuous stream from the main unit to the client. The client receives one stream that is either a single-view video stream or a multi-view video stream. The transition from transmitting a multi-view video stream to transmitting the single-view video stream is a seamless experience for the client.

The main unit may be a master unit. The plurality of sensors may then be considered slave units or parts of slave units. One advantage of the presently disclosed method of providing a video stream from a system having a main unit and a plurality of slave units is that when the condition for switching to transmitting a single-view video stream representing the dominating sensor data view, the commands from the client to the main unit can be forwarded to the slave unit from which the dominating sensor data view originates. This means that the commands will control the slave unit directly.

The present disclosure relates to the handling of zoom operations from the client. The starting point is that the main unit transmits a multi-view video stream from the main unit to the client. The multi-view video stream represents a multi-view composed of sensor data views from the plurality of sensors in the system, for example, a quad view or a picture-in-picture (PiP) view. When the main unit receives a command representing a zoom-in command from the client, a processing unit computes an updated multi-view based on the command. One of the sensor data views may now become a 'dominating' sensor data view in the sense that it occupies the largest area of the original sensor data views in the updated multi-view. The next step is to evaluate whether there is an area outside the dominating sensor data view and, in case there is, whether that area is greater than a predetermined threshold. If the area outside the dominating sensor data view is less than, or equal to, the predetermined threshold, the main unit switches to transmitting a single-view video stream representing the dominating sensor data view to the client. The single-view video stream shows video or a data representation from a single sensor. From both a user and a client perspective, the transition from transmitting a multi-view video stream to transmitting the single-view video stream is seamless. The single-view video stream may, typically, have a higher resolution than the multi-view video stream.

Preferably, the multi-view video stream is a single video stream comprising data views from multiple sensors in the system. This means that the multi-view may be an aggregated view of compressed data streams, whereas the single-view video stream is a single sensor stream showing video or data representation from a single sensor. The video streams from the sensors and the stream to the client can be controlled by the processing unit.

The present disclosure further relates to a system comprising:
  a main unit connected to a client;
  a plurality of sensors;
  a processing unit configured to:
    transmit a multi-view video stream from the main unit to the client, wherein the multi-view video stream represents a multi-view composed of sensor data views from the plurality of sensors in the system;
    compute, based on a received command from the client representing a zoom-in operation, an updated multi-view according to the received command;
    evaluate if the updated multi-view includes an area outside a dominating sensor data view in the updated multi-view that is greater than a predetermined threshold;
    if the area outside the dominating sensor data view is greater than the predetermined threshold, transmit a multi-view video stream representing the updated multi-view;
    if the area outside the dominating sensor data view is less than the predetermined threshold, transmit a single-view video stream representing the dominating sensor data view.

The disclosure further relates to a computer program having instructions which, when executed by a computing device or computing system, cause the computing device or computing system to carry out any embodiment of the presently disclosed method of providing a video stream. Computer program in this context shall be construed broadly and include, for example, a computer program to be run on a PC or a computer adapted to run as part of a surveillance system or any system comprising sensors.

These and other aspects of the invention are set forth in the following detailed description of the invention.

DESCRIPTION OF DRAWINGS

The invention will in the following be described with reference to the accompanying drawings, which are exemplary and not limiting to the presently disclosed method and a system for providing a video stream comprising sensor data views.

DETAILED DESCRIPTION

Figure 1:
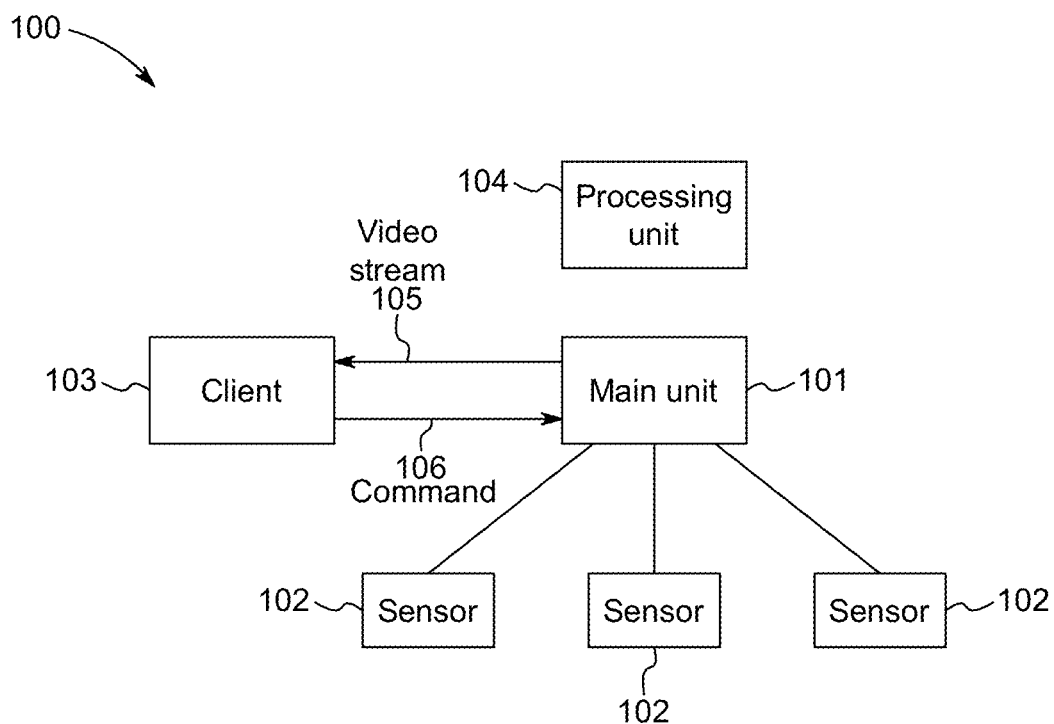
FIG. 1 shows a schematic view of an embodiment of the presently disclosed system for providing a video stream comprising sensor data views.

The present disclosure relates to a method of providing a video stream from a system comprising a main unit and a plurality of sensors. The method comprises a first step of transmitting a multi-view video stream from the main unit to a client, wherein the multi-view video stream represents a multi-view composed of sensor data views from the plurality of sensors in the system. A video stream may be seen as a sequence of image frames. However, all the views of the multi-view video stream do not necessarily have to be moving visual media or video. One or several views may comprise other sensor data, such as people counter data, or other information that is relevant in the multi-view video stream.

The method further comprises the step of receiving, in the main unit, a command from the client representing a zoom-in operation. The command may be sent in response to movement of an input device, for example a joystick. The method then extracts or computes an updated multi-view according to the received command. A zoom-in operation shall be construed broadly to cover zoom-in scenarios that may involve pan and/or tilt operations as well. If, for example, a user/client wishes to zoom into a peripheral area of a view, the zoom-in operation may be combined with a pan and/or tilt operation executed in the corresponding camera to obtain the updated multi-view. 'Peripheral' area of a view may refer to an outer section of the view, possibly even partly outside the view.

A zoom-in operation is based on a command, such as a VAPIX command, from the client. There are several types of zoom commands. According to a first type of zoom command, the zoom maintains the center point of the view and applies a level of zoom. This can correspond to a command called 'zoom' in VAPIX. In a second type of zoom, which is called 'area zoom' in VAPIX, a zoom is performed, but the center point (x,y) is changed. In addition, in VAPIX there is also a further zoom command 'continuouszoommove' that explicitly asks for a more continuous zoom so that it zooms more gradually. The zoom level can be expressed as relative or absolute values.

When the updated multi-view has been computed, it is evaluated whether the updated multi-view includes an area outside a dominating sensor data view in the updated multi-view that is greater than a predetermined threshold. A person skilled in art would have the necessary skills and tools to implement such an evaluation. He has information about the different views in the updated multi-view and can calculate the sizes of the views by well-known image processing techniques. The area sizes of the sensor data views in the updated multi-view can then be compared against each other. The sensor data view that occupies the largest area of the updated multi-view may be considered as the dominating sensor data view.

The method further comprises the step of changing from the multi-view video stream to a single-view video stream of the dominating sensor data view if the area outside the dominating sensor data view is less than, or equal to, the predetermined threshold. The predetermined threshold may be selected such that when the dominating sensor data view occupies substantially the whole updated multi-view, or at least a major part of the whole updated multi-view, the system switches to transmitting a single-view video stream to the client instead of the multi-view video stream. The threshold may be set to 0, which means that the system switches from the multi-view video stream to a single-view video stream only if the dominating sensor data view occupies the whole updated multi-view. Preferably, the video stream that is transmitted from the main unit to the client is coded in the same format for both views. Hence, according to this embodiment, the video format is the same for all video streams being sent to the client, and the client therefore does not have to be adapted or updated in order to comply with the presently disclosed method and system. The client always receives one video stream. The method may be carried out in substantially real-time.

Figure 4:
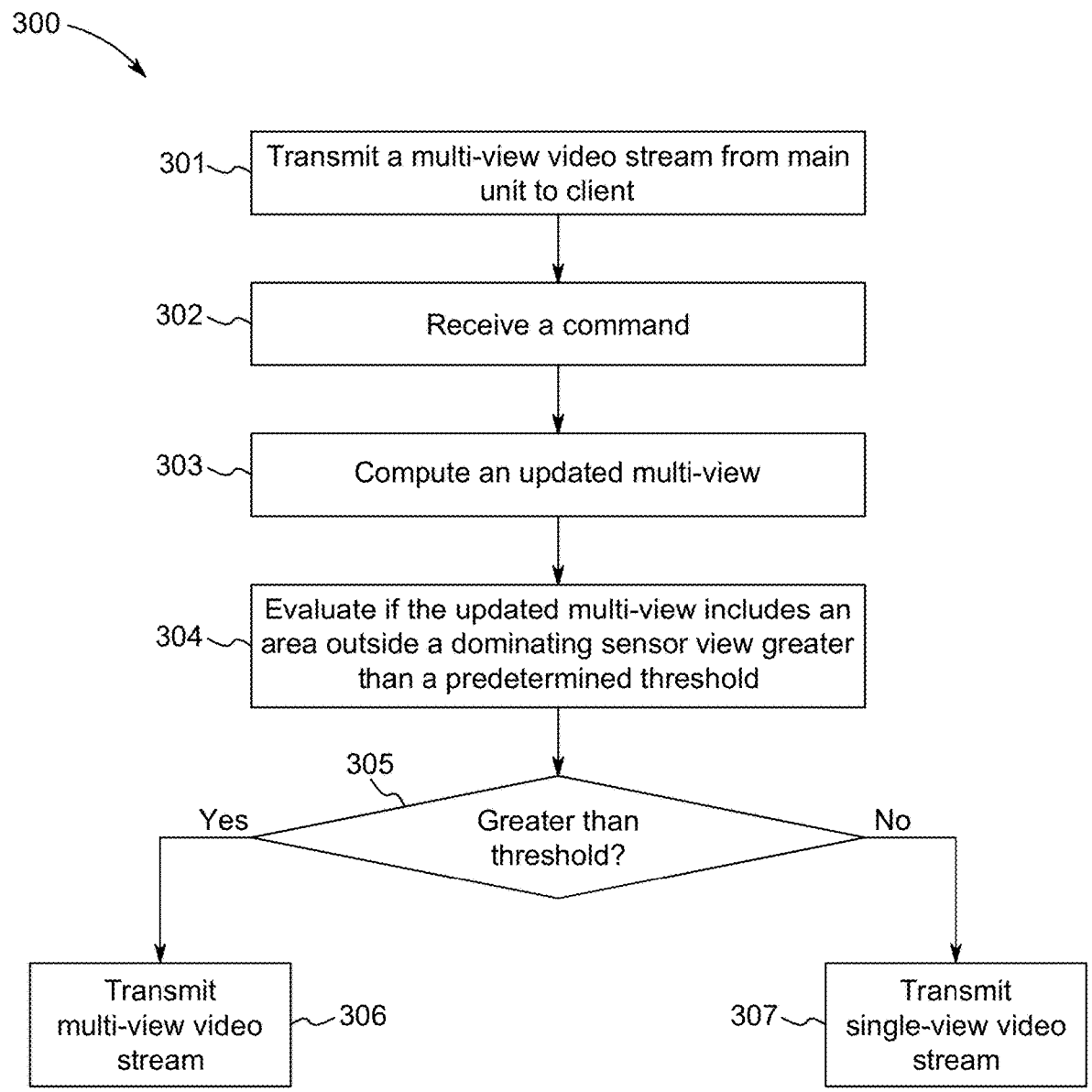
FIG. 4 shows a flow chart of one embodiment of the presently disclosed method for providing a video stream comprising sensor data views.

FIG. 4 shows a flow chart of one embodiment of the presently disclosed method for providing a video stream comprising sensor data views. The method comprises the steps of: transmitting (301) a multi-view video stream from main unit to client; receiving (302) a command from the client representing a zoom-in operation; computing (303) an updated multi-view; evaluating (304) if the updated multi-view includes an area outside a dominating sensor data view in the updated multi-view that is greater than a predetermined threshold; checking (305) if the area outside the dominating sensor data view is greater than the predetermined threshold; if yes, transmitting (306) a multi-view video stream representing the updated multi-view; and if no, transmitting (307) a single-view video stream representing the dominating sensor data view.

Figure 2A:
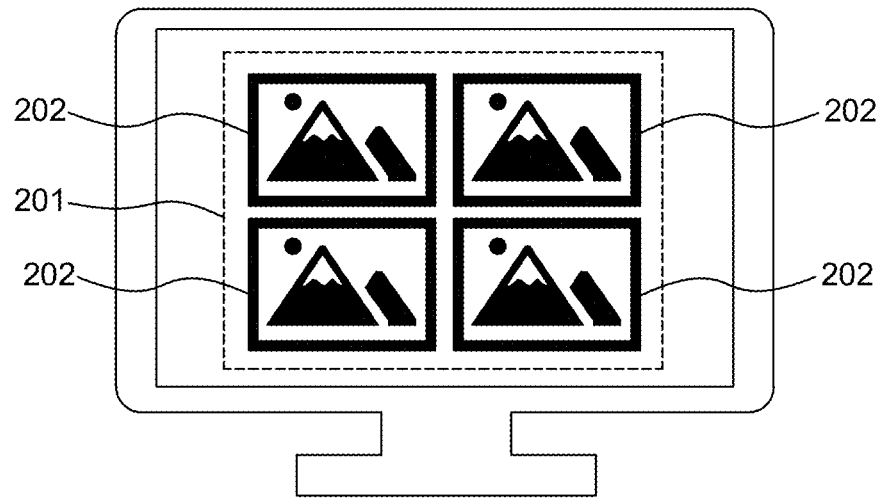
FIGS. 2A-D show a number of exemplary views of multi/single-views and zoom operations.
Figure 2B:
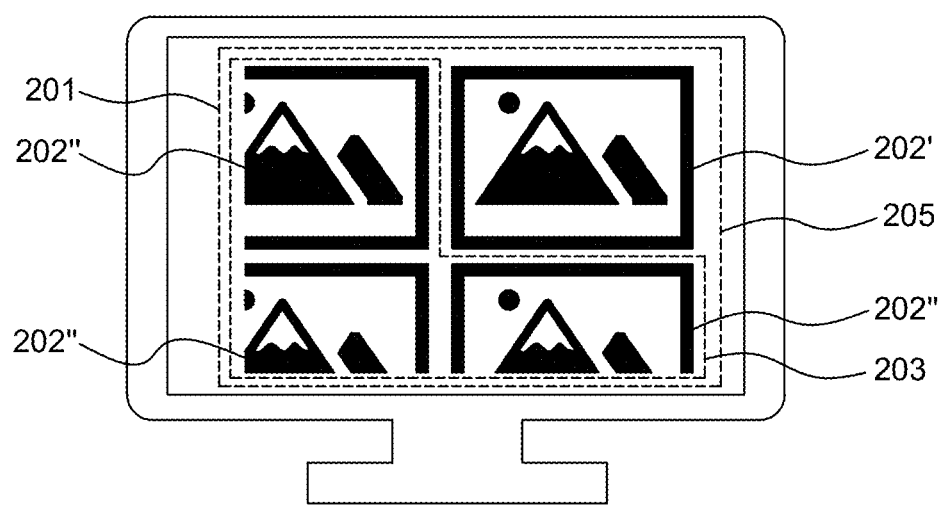
Figure 2C:
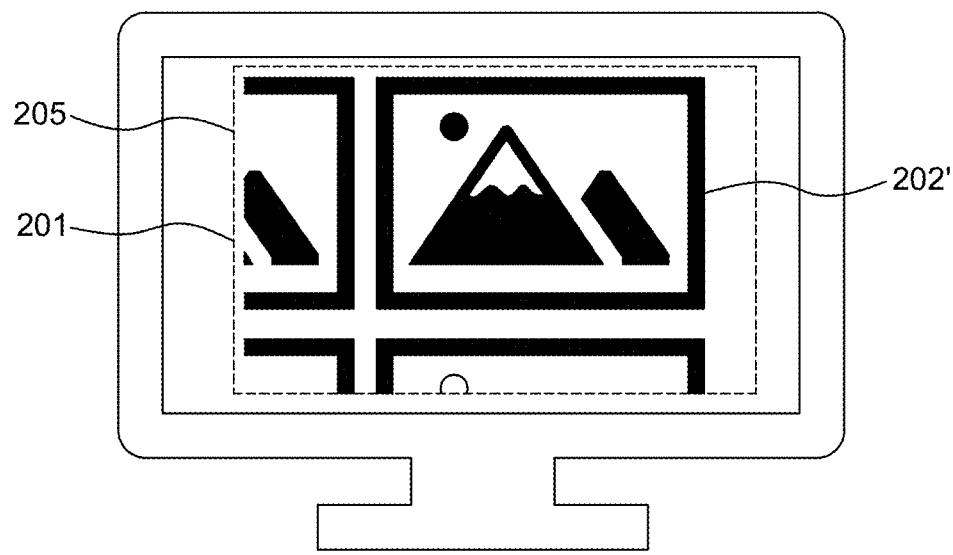
Figure 2D:
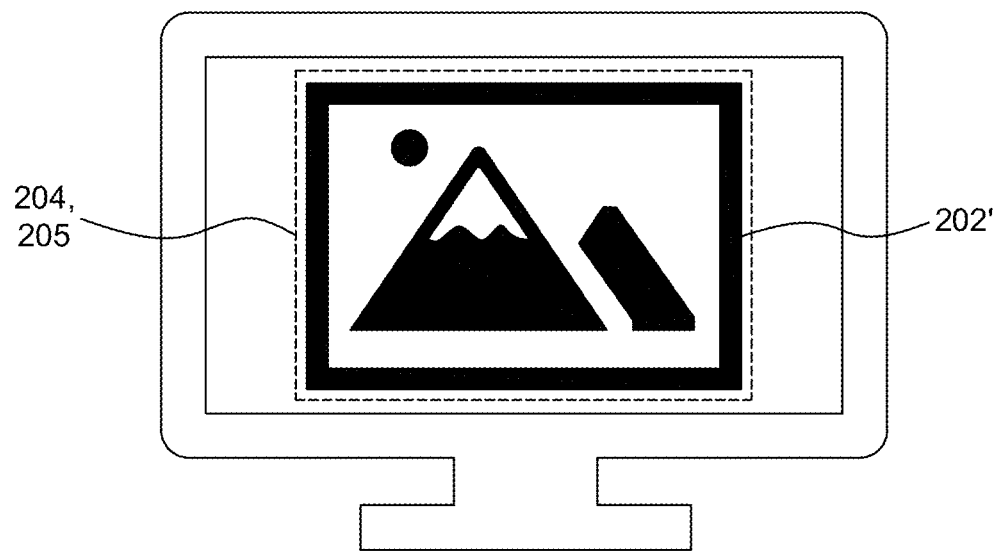

FIGS. 2A-D show a number of exemplary views of multi/single-views during a zoom operation process. Transitions and zoom operations according to FIG. 2A-2B-2C-2D illustrate examples of zoom operations. In FIG. 2A the client is provided with a multi-view video stream (201) comprising sensor data views (202) from a plurality of sensors in a system. The multi-view video stream (201) is thus a single video stream comprising a composition of multiple views. When the main unit receives a zoom-in command from the client, a processing unit computes, based on the received command from the client, an updated multi-view. Such an updated multi-view (205) is shown in FIG. 2B. Since the dominating sensor data view (upper right view (202') in FIG. 2B) in the updated multi-view does not occupy a sufficiency large part of the updated multi-view (205)—the area (203) outside the dominating sensor data view (202') is greater than a predetermined threshold—the main unit transmits a multi-view video stream (201) representing the updated multi-view (205). This updated multi-view (205) comprises the dominating sensor data view (202') and parts of the other sensor data views (202"). From the configuration of FIG. 2B, the client, which may be a VMS or similar, continues to zoom in to the configuration of FIG. 2C by sending a command to the main unit. The main unit updates the multi-view video-stream (201) to another updated multi-view (205) including the sensor data view (202), which is still the dominating view, but still not occupying a sufficiently large part of the whole updated multi-view (205) to switch to a single-view video stream. It shall be noted that there is a continuous stream from the main unit to the client. From FIG. 2C a further zoom-in command is received, upon which the system zooms in to the sensor data view (202) in FIG. 2D. Since the sensor data view (202) now occupies the whole updated multi-view (205), the main unit is configured to transmit a single-view video stream (204) instead of a multi-view video stream. The single-view video stream (204) represents the dominating sensor data view (202), which is the only view in the updated multi-view (205) in FIG. 2D. Thus, the transition is seamless from the user and client perspective. In case the single-view video stream comprises moving visual media or video, the single-view video stream may provide a higher resolution than the multi-view video stream for the sensor data view (202) or any of the enlarged versions thereof. From the configuration of FIG. 2D the system can go back to a multi-view video stream if, for example, the main unit receives a zoom-out command when a sensor data view (202) is shown in full size in the single-view video stream (204). The multi-view stream that is switched to can be of a predefined format, for example, a quad view.

Figure 3A:
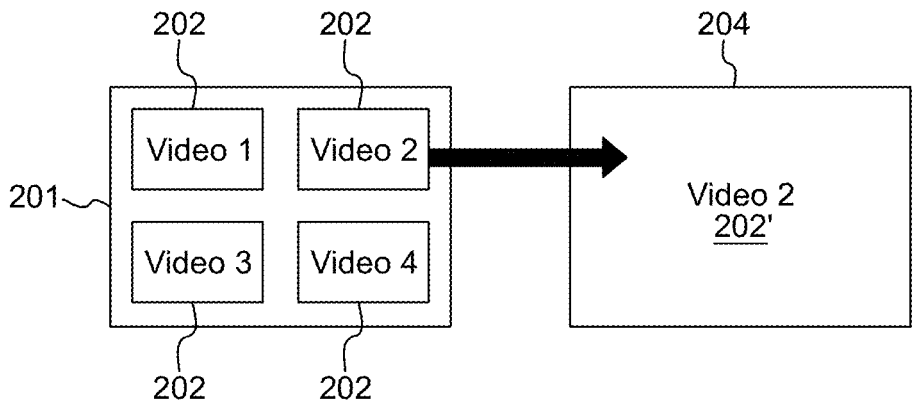
FIGS. 3A-C show a number of use cases for the presently disclosed method for providing a video stream comprising sensor data views.
Figure 3B:
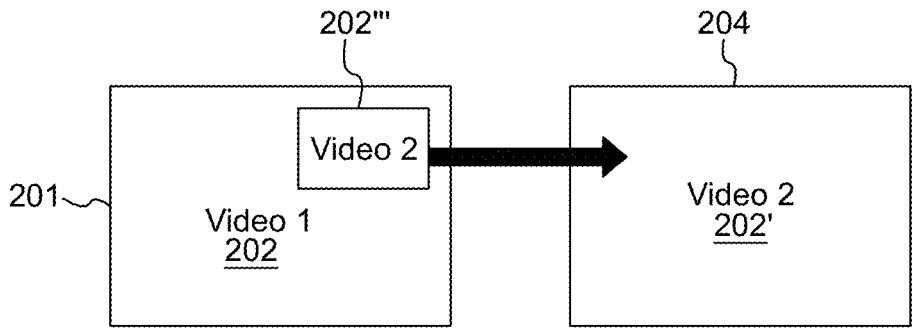
Figure 3C:
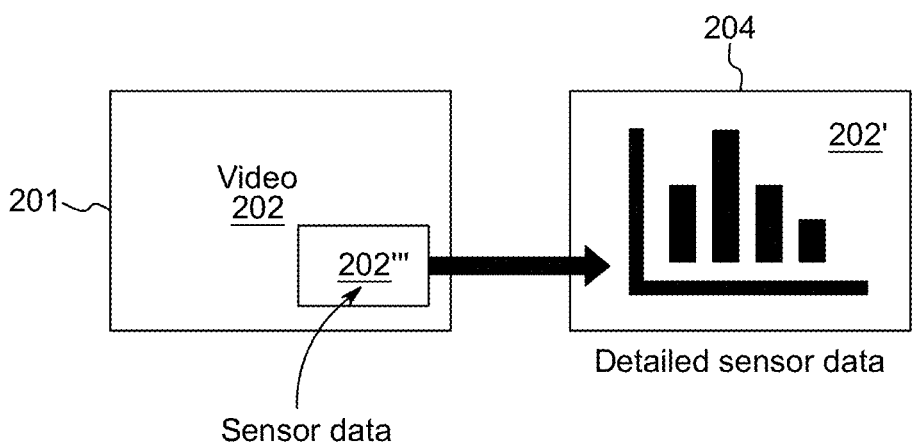

A multi-view video stream in the context of the present disclosure can be defined as a single video stream comprising sensor data views from the plurality of sensors in the form of visual media. The most typical visual medias are sequences of images, also referred to as video, or still images from image sensors. At least one of the sensor data views may be a video view from an image capturing unit. In video management systems, for example, for surveillance, it is very common to display a number of views side by side, for example, in a quad view configuration or other suitable configuration (3×3, 4×4, M×N etc.) to have an overview. An example of a quad view configuration is provided in FIG. 3A. Four sensor data views (202) (Video 1, Video 2, Video 3, and Video 4) are displayed side by side in a multi-view video stream (201). When a zoom-in operation to Video 2 occurs, which meets the criteria for switching to a single-view video stream, it causes the system to transmit a single-view video stream (204) representing the dominating sensor data view (202), in this case Video 2. A further example of multi-view is the picture-in-picture feature, in which one or several sensor data view(s) is/are displayed in inset windows overlapping other sensor data views. Such windows can be placed anywhere in/on the other sensor data views. One example of such a configuration is a view in which an overlapping view or window comprises a sensor data view in the form of a video. More specifically, according to one example, there may be one or several views showing an outside of a building. The inset window may then show a view from the inside of the building, captured by a camera device located inside the building. If the client sends a command for zooming in to the view showing the inside of the building, a single-view video stream of the inside of the building is transmitted. FIGS. 3B and 3C show examples of picture-in-picture configurations. In FIG. 3B, a second sensor data view (202''') (Video 2) is placed on top of a first sensor data view (202) (Video 1) in the multi-view video stream (201). The second sensor data view (202''') may be configured such that it partly blocks the view of the part of the first sensor data view (202) (Video 1) that is behind the second sensor data view (202''') (Video 2). Alternatively, the second sensor data view (202''') may be, at least partly, transparent. In FIG. 3C, a second sensor data view (202''') (Sensor data) is placed on top of a first sensor data view (202) (Video) in the multi-view video stream (201). The presently disclosed method of providing a video stream can be applied to the configurations of FIGS. 3B and 3C. In FIG. 3B, a zoom-in operation to Video 2, which meets the criteria for switching to a single-view video stream, causes the system to transmit a single-view video stream (204) representing the dominating sensor data view (202'), in this case Video 2. In FIG. 3C a zoom-in operation to the Sensor data (202''), which meets the criteria for switching to a single-view video stream, causes the system to transmit a single-view video stream (204) representing the dominating sensor data view (202'), which, in this case, is the Detailed sensor data (202''').

A further possible configuration is a configuration wherein the multi-view is a stitched view composed of sensor data views from multiple sensors in the system. Image stitching or photo stitching is the process of combining multiple images with overlapping or adjacent fields of view to produce a segmented panorama or high-resolution image.

Several possible configurations of units and sensors are possible within the presently disclosed method and a system for providing a video stream comprising sensor data views. The sensor data views may comprise an image, a video stream, a radar image stream, or a displayable representation of people counter data, or combinations thereof. A camera is an optical instrument that captures a visual image. It can capture still images or sequences of images. A camera is a device that can include one or several sensors. A PTZ camera is a camera that is capable of remote directional and zoom control. A PTZ camera usually includes only one image sensor. Other types of cameras are ePTZ or virtual pan-tilt-zoom (VPTZ) where a high-resolution camera digitally zooms and pans into portions of the image, with no physical camera movement. The presently disclosed method and system are not limited to particular types of cameras or sensors. The plurality of sensors may be sensors from different cameras but could also be sensors in one camera. Combinations of different types of sensors are also possible. As an example, a main unit may have a number of fixed image sensors pointing in different directions combined with a PTZ camera. Hence, in one embodiment the multi-view comprises sensor data views from one or more fixed camera views and a pan-tilt-zoom (PTZ) camera. The plurality of sensors may form part of the main unit, be external sensors, or a combination thereof.

In one embodiment of the presently disclosed method, the multi-view comprises a background video stream from a first sensor, and at least one superimposed video from a second sensor. The background video stream from a first sensor may be originated from a first camera whereas the at least one superimposed video stream from the second sensor is originated from a second camera. One of the streams can be a radar view from a radar or radar system.

The multi-view video stream is a single video stream comprising data views from multiple sensors in the system. This means that the multi-view may be an aggregated stream of compressed data streams, whereas the single-view video stream is a single sensor stream showing video or data representation from a single sensor. The main unit may be configured to transmit the multi-view video stream using the video compression standard of H.265. H.265 is also known as High Efficiency Video Coding (HEVC), a video compression standard designed as part of the MPEG-H project as a successor to the Advanced Video Coding (AVC) (H.264). When using the video compression standard of H.265, the main unit may be configured to receive encoded streams from the plurality of sensors and aggregate them. The main unit may, alternatively, be configured to transmit the multi-view video stream using the video compression standard of H.264.

As stated above, at least one of the plurality of sensors may be a non-image sensor, such as a monitoring sensor or sensor system configured to provide environmental data, such as data related to presence, number of people or objects, temperature, humidity, pollution, fire, or a biochemical sensor or sensor system configured to provide environmental data. As would be recognized by a person skilled in the art, cameras can be used as people counters. Camera-based applications can, for example, provide information about number of people passing a site and in which directions they move. It can also provide trends, peaks and other valuable information. In one embodiment of the presently disclosed method, a single-view video stream comprising a more detailed view of the environmental data of the non-image sensor is transmitted, upon receiving a zoom-in operation, if the dominating view is a view of the non-image sensor and the area outside the dominating sensor data view is less than, or equal to, the predetermined threshold. That is, if one of the plurality of sensors is a non-image sensor, such as a people counter, the multi-view video stream before zooming in may comprise high-level information related to the people counter. When a zoom-in occurs and the system switches to single-view video stream, a more detailed view with more detailed information of the people counter is transmitted.

Moreover, when the system has switched to the single-view video stream according to the presently disclosed method, in the case where single-view video stream comprises a view from a non-image sensor, the system preferably is configured such that the client can continue to use the same commands, such as VAPIX, including pan/tilt/zoom commands. In a single-view video stream of data from the non-image sensor, this may, for example, imply that a further zoom-in provides even more detailed data and/or that a pan or tilt updates time windows or other parameters for the data.

The presently disclosed method of providing a video stream may further comprise the step of displaying the multi-view video stream or single-view video stream on a display.

The present disclosure further relates to a system comprising:
    a main unit connected to a client;
    a plurality of sensors;
    a processing unit configured to:
        transmit a multi-view video stream from the main unit to the client, wherein the multi-view video stream represents a multi-view composed of sensor data views from the plurality of sensors in the system;

compute, based on a received command from the client representing a zoom-in operation, an updated multi-view according to the received command;

evaluate if the updated multi-view includes an area outside a dominating sensor data view in the updated multi-view that is greater than a predetermined threshold;

if the area outside the dominating sensor data view is greater than the predetermined threshold, transmit a multi-view video stream representing the updated multi-view;

if the area outside the dominating sensor data view is less than the predetermined threshold, transmit a single-view video stream representing the dominating sensor data view.

FIG. 1 shows a schematic view of an embodiment of the presently disclosed system (101). A main unit (101) can transmit the video stream (105) to a client (103). The system comprises a plurality of sensors (102) that are either part of the main unit (101) or connected to the main unit (101). A processing unit (104) is configured handle commands received from the client (103) and determine whether a multi-view video-stream or a single-view video stream shall be transmitted to the client (103).

A person skilled in the art will recognize that the presently disclosed system may be configured to perform any embodiment of the presently disclosed method of providing a video stream from a system comprising a main unit and a plurality of sensors. The plurality of sensors may form part of the main unit. Alternatively, the plurality of sensors are external sensors. A combination of these alternatives is also possible.

The system may further comprise useful components such as a client, wherein the client may comprise a video management system and/or a display and/or a software application, wired or wireless interfaces to the client for sending a video stream and receiving commands etc.

The present disclosure further relates to a method of providing a video stream from a system comprising a main unit and a plurality of sensors, wherein the main unit is configured to receive data from the plurality of sensors, the method comprising the steps of:

transmitting a single-view video stream from the main unit to a client, wherein the single-view video stream represents a single-view from one of the plurality of sensors; and upon receiving a command from the client representing a zoom-out operation, transmitting a multi-view video stream from the main unit to the client, wherein the multi-view video stream represents a multi-view composed of sensor data views from the plurality of sensors in the system.

The method of providing a video stream for zoom-out is useful for shifting back from the single-view video stream to the multi-view video stream when the user zooms out. In the single-view video stream a single-view from one of the plurality of sensors is transmitted.

According to one embodiment the method switches from transmitting the single-view video stream to transmitting the multi-view video stream when a zoom-out occurs from a configuration in which there is a zoom-in within the single-view, i.e. wherein not all the content of the single-view is shown. The user zooming out to a level wherein all of a computed (based on the zoom-out command) updated single-view fits into the view can be used as a trigger to switch to transmitting the multi-view video stream. Preferably, the multi-view video stream is a predetermined multi-view video stream.

In one embodiment the system continues to transmit the single-view video stream until the main unit receives two zoom-out commands while the single-view is in full size, upon which the main unit switches to transmitting the multi-view video stream. This may prevent an unintentional switch from the single-view video stream to the multi-view video stream. Alternatively, the system may be configured to switch to transmitting the multi-view video stream based on a lapsed predefined period of time. Such a predefined period of time can be calculated and set based on a frequency of commands sent from the client to the main unit. If it is known how often commands are sent, a certain predefined time will correspond a number of commands, in this case zoom-out commands, have been sent. A further option for providing a condition for switching to transmitting the multi-view video stream is to switch when a zoom-out level is greater than a predefined limit, i.e. for small zoom-outs, do not switch, and for zoom-outs of a certain minimum magnitude, switch.

The method of providing a video stream may further comprise the steps of, continuing from the multi-view video stream configuration:

receiving, in the main unit, a command from the client representing a zoom-in operation;

computing an updated multi-view according to the received command;

evaluating if the updated multi-view includes an area outside a dominating sensor data view in the updated multi-view that is greater than a predetermined threshold;

if the area outside the dominating sensor data view is greater than the predetermined threshold, transmitting a multi-view video stream representing the updated multi-view;

if the area outside the dominating sensor data view is less than, or equal to, the predetermined threshold, transmitting a single-view video stream representing the dominating sensor data view.

Figure 5:
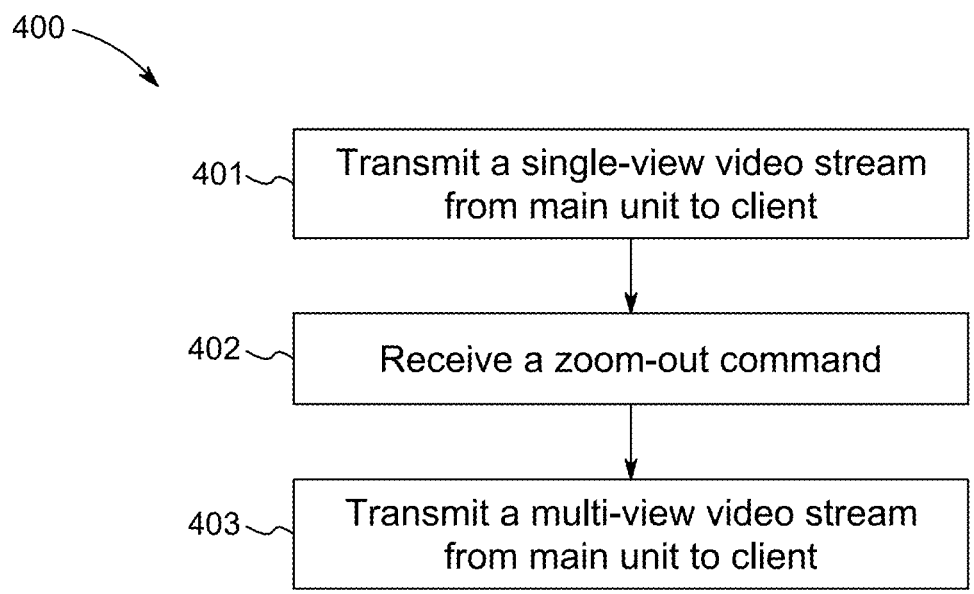
FIG. 5 shows a flow chart of an embodiment of a method for providing a video stream comprising sensor data views, the method comprising handling of a zoom-out operation.

FIG. 5 shows a flow chart of an embodiment of a method for providing a video stream comprising sensor data views (400). The method comprises the steps of: transmitting a single-view video stream from the main unit to a client, wherein the single-view video stream represents a single-view from one of the plurality of sensors (401); and, upon receiving a command from the client representing a zoom-out operation (402), transmitting a multi-view video stream from the main unit to the client, wherein the multi-view video stream represents a multi-view composed of sensor data views from the plurality of sensors in the system (403).

As stated above, combinations of different types of sensors are also possible. The presently disclosed technology would also work for a fisheye lens. A fisheye lens is an ultra-wide-angle lens that produces strong visual distortion intended to create a wide panoramic or hemispherical image. What is special with fisheye is that a DPTZ operation on a fisheye image is not merely a crop of the image, but also dewarped, so that it is more of a rectilinear transform of a crop of the image. The principle is otherwise the same. A fisheye can be one sensor data view in a multi-view. If there is only one sensor data view, which is a fish eye view, a client could send commands for zooming in the fish eye view. In principle it would be possible to use this zooming to switch to transmitting a dewarped single-view video stream of a sub-view showed in the fisheye view if the area outside the sub-view is less than a predetermined threshold.

The invention claimed is:

1. A method of providing a video stream from a system comprising a main unit and a plurality of sensors, wherein the main unit is configured to receive data from the plurality of sensors, the method comprising the steps of:
transmitting a multi-view video stream from the main unit to a client,
wherein the multi-view video stream represents a multi-view composed of sensor data views from the plurality of sensors in the system;
receiving, in the main unit, a command from the client representing a zoom-in operation;
computing an updated multi-view according to the received command;
evaluating if the updated multi-view includes an area outside a dominating sensor data view in the updated multi-view that is greater than a predetermined threshold,
wherein the dominating sensor data view is the sensor data view that occupies the largest area of the updated multi-view;
if the area outside the dominating sensor data view is greater than the predetermined threshold, transmitting a multi-view video stream representing the updated multi-view;
if the area outside the dominating sensor data view is less than, or equal to, the predetermined threshold, transmitting a single-view video stream representing the dominating sensor data view.

2. The method of providing a video stream according to claim 1, wherein the dominating sensor data view in the updated multi-view is the sensor data view that occupies the largest area of the updated multi-view.

3. The method of providing a video stream according to claim 1, wherein the predetermined threshold is 0.

4. The method of providing a video stream according to claim 1, wherein the plurality of sensors form part of the main unit, or wherein the plurality of sensors are external sensors, or a combination thereof.

5. The method of providing a video stream according to claim 1, wherein the main unit is a master unit and the plurality of sensors are slave units or part of slave units, further comprising the step of forwarding further commands from the client to a slave unit corresponding to the dominating sensor data view when transmitting the single-view video stream.

6. The method of providing a video stream according to claim 1, wherein the single-view video stream has a higher resolution than the dominating sensor data view of the multi-view video stream representing the updated multi-view.

7. The method of providing a video stream according to claim 1,
wherein at least one of the plurality of sensors is a non-image sensor, such as a monitoring sensor or sensor system configured to provide environmental data, such as data related to presence, number of people or objects, temperature, humidity, pollution, fire, or a biochemical sensor or sensor system configured to provide environmental data,
wherein, upon receiving a command representing a zoom-in operation, if the dominating sensor data view is a view of the non-image sensor and the area outside the dominating sensor data view is less than, or equal to, the predetermined threshold, a single-view video stream comprising a more detailed view of the environmental data of the non-image sensor is transmitted.

8. The method of providing a video stream according to claim 1, wherein the multi-view video stream is a single video stream comprising data views from multiple sensors in the system.

9. The method of providing a video stream according to claim 1, wherein the multi-view is an aggregated view of compressed data streams.

10. The method of providing a video stream according to claim 1, wherein the multi-view is a picture-in-picture view.

11. The method of providing a video stream according to claim 1, wherein the multi-view comprises a background video stream from a first sensor, and at least one superimposed video from a second sensor.

12. A non-transitory computer product containing a computer program having instructions which, when executed by a computing device or computing system, cause the computing device or computing system to carry out the method according to claim 1.

13. A system comprising:
a main unit connected to a client;
a plurality of sensors;
a processing unit configured to:
transmit a multi-view video stream from the main unit to the client, wherein the multi-view video stream represents a multi-view composed of sensor data views from the plurality of sensors in the system;
compute, based on a received command from the client representing a zoom-in operation, an updated multi-view according to the received command;
evaluate if the updated multi-view includes an area outside a dominating sensor data view in the updated multi-view that is greater than a predetermined threshold,
wherein the dominating sensor data view is the sensor data view that occupies the largest area of the updated multi-view;
if the area outside the dominating sensor data view is greater than the predetermined threshold, transmit a multi-view video stream representing the updated multi-view;
if the area outside the dominating sensor data view is less than the predetermined threshold, transmit a single-view video stream representing the dominating sensor data view.

* * * * *